US010032418B2

(12) United States Patent
Sako et al.

(10) Patent No.: US 10,032,418 B2
(45) Date of Patent: Jul. 24, 2018

(54) DISPLAY APPARATUS

(71) Applicant: Japan Display Inc., Tokyo (JP)

(72) Inventors: Kazuhiko Sako, Tokyo (JP); Naoyuki Takasaki, Tokyo (JP); Tsutomu Harada, Tokyo (JP); Tatsuya Yata, Tokyo (JP); Shigenori Aoki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/583,146

(22) Filed: May 1, 2017

(65) Prior Publication Data

US 2017/0323600 A1 Nov. 9, 2017

(30) Foreign Application Priority Data

May 9, 2016 (JP) ................................ 2016-093860
Apr. 27, 2017 (JP) ................................ 2017-087958

(51) Int. Cl.
*G06F 3/038* (2013.01)
*G09G 3/34* (2006.01)

(52) U.S. Cl.
CPC ..... *G09G 3/342* (2013.01); *G09G 2320/0271* (2013.01); *G09G 2320/0686* (2013.01); *G09G 2360/147* (2013.01)

(58) Field of Classification Search
USPC .... 345/207, 102, 38, 87, 589, 1.3, 690, 599; 353/31; 399/49
See application file for complete search history.

(56) References Cited

U.S. PATENT DOCUMENTS 8,704,752 B2 4/2014 Wasinger et al.
2006/0125773 A1* 6/2006 Ichikawa .......... G02F 1/133611 345/102
2006/0214904 A1* 9/2006 Kimura .................. G09G 3/342 345/102
2007/0120765 A1* 5/2007 Misonou ................ G09G 3/342 345/38
(Continued)

FOREIGN PATENT DOCUMENTS

JP 2013-246426 A 12/2013
JP 2016-161921 A 9/2016

*Primary Examiner* — Thuy Pardo
(74) *Attorney, Agent, or Firm* — Michael Best & Friedrich LLP

(57) ABSTRACT

According to an aspect, a display apparatus includes: a plurality of light sources; a display device that includes a display area provided with $n_1$ pixels and that is irradiated with light from the light sources; a light source controller controlling an operation of the light sources; and a display controller controlling an output gradation value of part or all of the pixels. The display area includes a plurality of partial areas, the partial areas corresponding to the light sources on a one-to-one basis. The light source controller determines the amount of light emitted from each light source corresponding to a corresponding one of the partial areas based on luminance of light required for the corresponding partial area. The display controller performs first correction and second correction when the amounts of light emitted from two light sources corresponding to two adjacent partial areas are different.

5 Claims, 8 Drawing Sheets

(56) References Cited

U.S. PATENT DOCUMENTS

2008/0259020 A1* 10/2008 Fisekovic .............. G09G 3/342 345/102
2009/0289879 A1* 11/2009 Ito .......................... G09G 3/342 345/87
2010/0007577 A1* 1/2010 Ninan ..................... H01J 63/06 345/1.3
2010/0039440 A1* 2/2010 Tanaka ................... G09G 3/342 345/589
2010/0045694 A1* 2/2010 Tanaka ................... G09G 3/342 345/589
2011/0164010 A1* 7/2011 Yamamoto ........... G09G 3/3233 345/207
2011/0227968 A1* 9/2011 Shimizu ................. G09G 3/342 345/690
2011/0267380 A1* 11/2011 Ohnishi ............... G01C 21/367 345/690
2012/0133673 A1* 5/2012 Ninan ............... G02F 1/133603 345/599
2013/0243459 A1* 9/2013 Omori ................ G03G 15/5058 399/49
2015/0277212 A1* 10/2015 Shishido ............ G03B 21/2013 353/31
2016/0260395 A1 9/2016 Sako et al.
2016/0327779 A1* 11/2016 Hillman ............... G02B 21/367 345/207

* cited by examiner

DISPLAY APPARATUS

CROSS-REFERENCE TO RELATED APPLICATIONS

This application claims priority from Japanese Application No. 2016-093860, filed on May 9, 2016, and Japanese Application No. 2017-087958, filed on Apr. 27, 2017, the contents of which are incorporated by reference herein in its entirety.

BACKGROUND

1. Technical Field

The present invention relates to a display apparatus.

2. Description of the Related Art

Widely known are display apparatuses having a local dimming function of dividing a light emitting surface of a light source device, such as a backlight, into a plurality of areas and controlling output of light from light sources in each of the divided areas individually depending on a video signal for the area. An example of such display apparatuses is disclosed in Japanese Patent Application Laid-open Publication No. 2013-246426.

A plurality of light sources have individual differences and vary in luminance distribution of light output therefrom. To precisely perform local dimming, the display apparatuses need to hold information indicating the luminance distribution of each light source and require a resource that holds the information. The size of the resource increases in proportion to the number of light sources, which is a great load on performing local dimming.

The light from each light source reaches not only a corresponding area precisely but also part near the corresponding area, such as adjacent areas. To precisely perform local dimming, the display apparatuses need to perform an arithmetic operation considering the relation between the light sources and require a resource that performs the arithmetic operation. The size of the resource increases in proportion to the number of areas, which is a great load on performing local dimming.

Simply performing local dimming may possibly cause boundaries between adjacent areas to be visually recognized because of the difference in luminance between the areas.

For the foregoing reasons, there is a need for a display apparatus that can perform local dimming with a smaller load while making boundaries less likely to be visually recognized.

SUMMARY

According to an aspect, a display apparatus includes: a plurality of light sources aligned in at least one direction; a display device that includes a display area provided with $n_1$ pixels and that is irradiated with light from the light sources to output an image; a light source controller that controls an operation of the light sources in accordance with a display output content of the display device; and a display controller that controls an output gradation value of part or all of the pixels based on an amount of light emitted from each of the light sources. The display area includes a plurality of partial areas, the partial areas corresponding to the light sources on a one-to-one basis. The partial areas each include $n_2$ pixels aligned in at least the one direction. The light source controller determines the amount of light emitted from each light source corresponding to a corresponding one of the partial areas based on luminance of light required for the corresponding partial area. The display controller performs first correction and second correction when the amounts of light emitted from two light sources corresponding to two adjacent partial areas are different.

The first correction is a correction of decreasing the output gradation values of the pixels arranged in a first region extending from a boundary to a position of an m-th pixel from the boundary out of the pixels in a first partial area, the second correction is a correction of increasing the output gradation values of the pixels arranged in a second region extending from the boundary to a position of an m-th pixel from the boundary out of the pixels in a second partial area, and the boundary is a boundary between the first partial area and the second partial area. The first partial area is one of the two adjacent partial areas and corresponds to a first light source, and the second partial area is the other of the two adjacent partial areas and corresponds to a second light source. The first light source is one of the two light sources and emits a relatively large amount of light, and the second light source is the other of the two light sources and emits a relatively small amount of light. The output gradation value after the first correction is an output gradation value obtained when the pixels controlled by the output gradation value prior to the first correction are irradiated with light from a first virtual light source, and the amount of light from the first virtual light source is less than the amount of light emitted from the first light source emitting a relatively large amount of light and more than an intermediate amount of the amounts of light emitted from the two light sources. The output gradation value after the second correction is an output gradation value obtained when the pixels controlled by the output gradation value prior to the second correction are irradiated with light from a second virtual light source, and the amount of light from the second virtual light is more than the amount of light emitted from the second light source emitting a relatively small amount of light and less than the intermediate amount of the amounts of light emitted from the two light sources. $n_1>n_2>m\geq1$ is satisfied.

DETAILED DESCRIPTION

Figure 1:
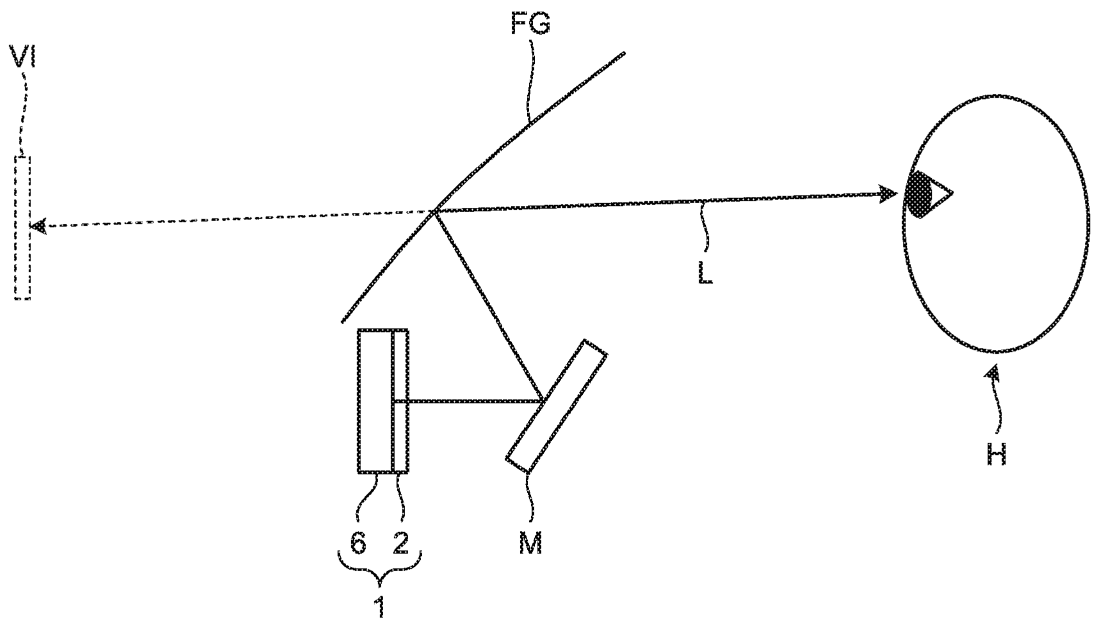
FIG. 1 is a diagram schematically illustrating a main configuration of a display apparatus according to an embodiment.

Exemplary embodiments according to the present invention are described below with reference to the accompanying drawings. The disclosure is given by way of example only, and appropriate changes made without departing from the spirit of the invention and easily conceivable by those skilled in the art are naturally included in the scope of the invention. The drawings may possibly illustrate the width, the thickness, the shape, and the like of each unit more schematically than the actual aspect to simplify the explanation. These elements, however, are given by way of example only and are not intended to limit interpretation of the invention. In the present specification and the figures, components similar to those previously described with reference to preceding figures are denoted by the same reference numerals, and overlapping explanation thereof may be appropriately omitted.

In this disclosure, when an element is described as being “on” another element, the element can be directly on the other element, or there can be one or more elements between the element and the other element.

FIG. 1 is a diagram schematically illustrating a main configuration of a display apparatus 1 according to an embodiment of the present invention. The display apparatus 1 includes a light source device 6 and a display device 2, for example. The display device 2 is irradiated with light L from the light source device 6 to output an image. The light L output from the light source device 6 is reflected by the display device 2, a mirror M, and a windshield FG to reach a user H. As a result, the light L is recognized as an image VI in a field of vision of the user H. In other words, the display apparatus 1 according to the present embodiment serves as a head-up display (HUD) using the mirror M and the windshield FG.

The following describes the display device 2. The display device 2 according to the present embodiment is a transmissive liquid crystal display device that transmits the light L therethrough to output an image. Alternatively, the display device 2 may be a reflective liquid crystal display device or a digital micromirror device (DMD, registered trademark), for example.

Figure 2:
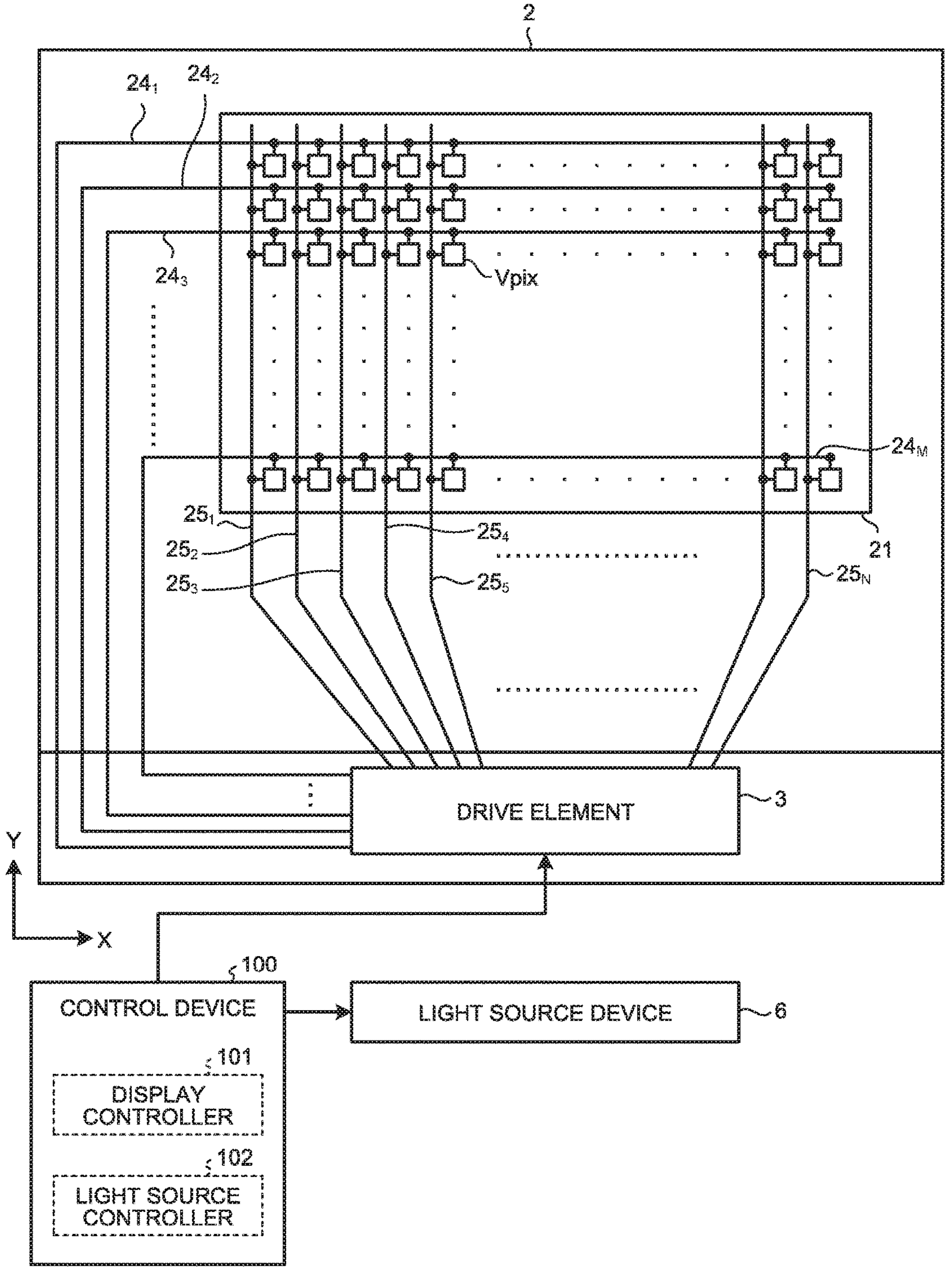
FIG. 2 is a block diagram of an exemplary system configuration of a display device according to the present embodiment.
Figure 3:
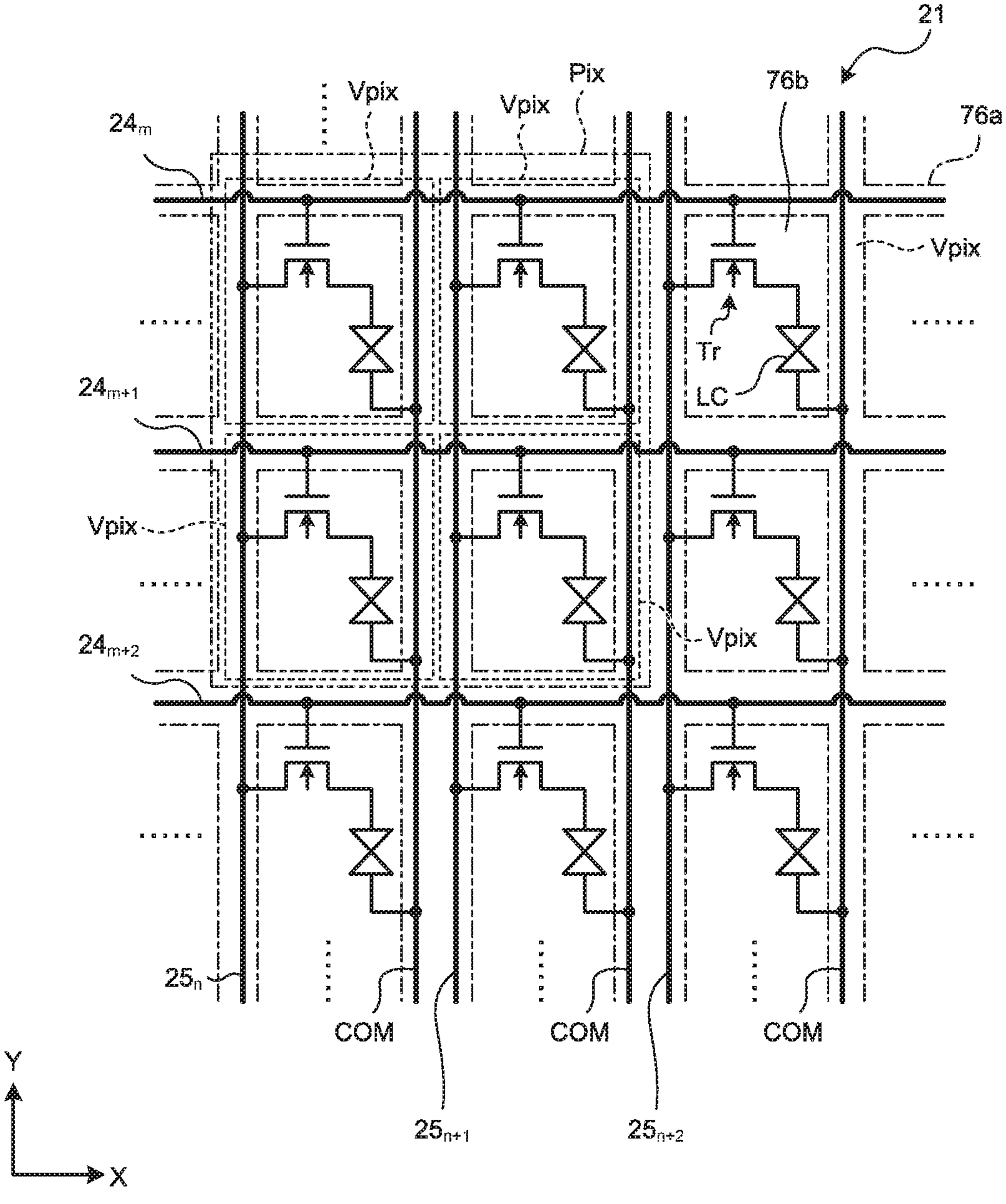
FIG. 3 is a circuit diagram of a drive circuit that drives pixels in the display device according to the present embodiment.

FIG. 2 is a block diagram of an exemplary system configuration of the display device 2 according to the present embodiment. FIG. 3 is a circuit diagram of a drive circuit that drives pixels Pix in the display device 2 according to the present embodiment. The pixel Pix includes a plurality of sub-pixels Vpix. The display device 2 is a transmissive liquid crystal display device, for example, and includes an image output panel and a drive element 3, such as a display driver integrated circuit (DDIC).

The image output panel includes a translucent insulating substrate, such as a glass substrate. The image output panel further includes a display area 21 on the surface of the glass substrate. In the display area 21, a plurality of pixels Pix (refer to FIG. 3) including a liquid crystal cell are arranged in a matrix (rows and columns). The glass substrate includes a first substrate and a second substrate. The first substrate has a plurality of pixel circuits including an active element (e.g., a transistor) and arranged in a matrix. The second substrate is arranged facing the first substrate with a predetermined gap interposed therebetween. The gap between the first substrate and the second substrate is maintained at the predetermined gap by photo spacers. The photo spacers are arranged at a plurality of positions on the first substrate. The gap between the first substrate and the second substrate is sealed with liquid crystals. The arrangement and the sizes of the components illustrated in FIG. 2 are given by way of schematic example only, and they do not indicate actual arrangement and other elements.

The display area 21 has a matrix (row-and-column) structure in which M×N sub-pixels Vpix including a liquid crystal layer are arranged. In the present specification, a row indicates a pixel row including N sub-pixels Vpix arrayed in one direction. A column indicates a pixel column including M sub-pixels Vpix arrayed in a direction orthogonal to the direction in which the row extends. The values of M and N are determined depending on resolution in the vertical direction and resolution in the horizontal direction, respectively. In the display area 21, scanning lines $\mathbf{24}_1$, $\mathbf{24}_2$, $\mathbf{24}_3$, . . . , and $\mathbf{24}_M$ are arranged in respective rows, and signal lines $\mathbf{25}_1$, $\mathbf{25}_2$, $\mathbf{25}_3$, . . . , and $\mathbf{25}_N$ are arranged in respective columns for the array of M×N sub-pixels Vpix. In the present embodiment, the scanning lines $\mathbf{24}_1$, $\mathbf{24}_2$, $\mathbf{24}_3$, . . . , and $\mathbf{24}_M$ may be collectively referred to as scanning lines 24, and the signal lines $\mathbf{25}_1$, $\mathbf{25}_2$, $\mathbf{25}_3$, and $\mathbf{25}_N$ may be collectively referred to as signal lines 25. In the present embodiment, certain three scanning lines out of the scanning lines $\mathbf{24}_1$, $\mathbf{24}_2$, $\mathbf{24}_3$, . . . , and $\mathbf{24}_M$ are referred to as scanning lines $\mathbf{24}_m$, $\mathbf{24}_{m+1}$, and $\mathbf{24}_{m+2}$ (m is a natural number satisfying $m \le M-2$), and certain four signal lines out of the signal lines $\mathbf{25}_1$, $\mathbf{25}_2$, $\mathbf{25}_3$, . . . , and $\mathbf{25}_N$ are referred to as signal lines $\mathbf{25}_n$, $\mathbf{25}_{n+1}$, $\mathbf{25}_{n+2}$, and $\mathbf{25}_{n+3}$ (n is a natural number satisfying $n \le N-3$).

The drive element 3 is a circuit mounted on the glass substrate of the image output panel by chip-on-glass (COG), for example. The drive element 3 is coupled to a control device 100 via flexible printed circuits (FPC), which are not illustrated. The control device 100 is a circuit that controls operations of the display device 2 and the light source device 6. Specifically, the control device 100 serves as a display controller 101 and a light source controller 102, for example. The display controller 101 outputs a pixel signal for individually driving a plurality of sub-pixels Vpix constituting the pixel Pix. The pixel signal is obtained, for example, by combining respective gradation values of red (R), green (G), blue (B), and white (W), which will be described later. The types and the number of colors corresponding to the respective gradation values constituting the pixel signal are arbitrarily determined. The display controller 101 has a function of controlling output gradation values of part or all of a plurality of pixels Pix based on the amount of light emitted from a light source 6*a* controlled by the light source controller 102. The light source controller 102 controls operations of the light source 6*a* based on the display output contents of the display device 2.

Specifically, the light source controller 102 individually controls operations of a plurality of light sources 6*a* included in the light source device 6. The control device 100 may have a function of outputting various signals (e.g., master clocks, horizontal synchronization signals, and vertical synchronization signals) used for the operations of the display device 2. The structure that outputs the various signals may be separately provided.

The light source controller 102 according to the present embodiment performs what is called one-frame delay control of controlling the operations of the light sources 6*a* based on the pixel signals output from the display controller 101 in the previous frame. By performing the one-frame delay control, the light source controller 102 does not require any buffer that holds the pixel signals, which is necessary for controlling the operations of the light sources 6*a* in the same frame as that of the pixel signals. The light source controller 102 may include a buffer to control the operations of the light sources 6*a* in the same frame as that of the pixel signals.

The display device 2 is coupled to an external input power source, which is not illustrated, for example. The external input power source supplies electric power required for the operations of the display device 2 via a coupling terminal 41, which will be described later, for example.

More specifically, the drive element 3 operates the display device 2 based on the various signals supplied from the control device 100, for example. The control unit 100 outputs the master clocks, the horizontal synchronization signals, the vertical synchronization signals, the pixel signals, and drive command signals for the light source device 6, for example, to the drive element 3. Based on these signals, for example, the drive element 3 serves as a gate driver and a source driver. One or both of the gate driver and the source driver may be provided on the substrate using a thin film transistor (TFT), which will be described later. In this case, one or both of the gate driver and the source driver are electrically coupled to the drive element 3. The source driver and the gate driver may be electrically coupled to different drive elements 3 or the same single drive element 3.

The gate driver latches digital data in units of one horizontal period based on the horizontal synchronization signals in synchronization with the vertical synchronization signals and the horizontal synchronization signals. The gate driver sequentially outputs and supplies the latched digital data of one line as a vertical scanning pulse to each of the scanning lines 24 (scanning lines $\mathbf{24}_1$, $\mathbf{24}_2$, $\mathbf{24}_3$, . . . , and $\mathbf{24}_M$) of the display area 21. The gate driver thus sequentially selects the sub-pixels Vpix row by row. The gate driver, for example, sequentially outputs the digital data to the scanning lines $\mathbf{24}_1$, $\mathbf{24}_2$, . . . in the row direction, that is, from a first end side to a second end side of the display area 21. Alternatively, the gate driver may sequentially output the digital data to the scanning lines $\mathbf{24}_M$ . . . in the row direction, that is, from the second end side to the first end side of the display area 21.

The source driver is supplied with data for driving pixels generated based on the pixel signals, for example. The source driver writes the data for driving pixels to the sub-pixels Vpix of the row selected in vertical scanning performed by the gate driver in units of a sub-pixel, a plurality of sub-pixels, or all the sub-pixels via the signal lines 25 (signal lines $\mathbf{25}_1$, $\mathbf{25}_2$, $\mathbf{25}_3$, . . . , and $\mathbf{25}_N$).

Some types of methods for driving a liquid crystal display device are known, including line inversion, dot inversion, and frame inversion driving methods. The line inversion driving method is a method of reversing the polarity of video signals at a time period of 1H (H denotes a horizontal period). 1H corresponds to one line (one pixel row). The dot inversion driving method is a method of alternately reversing the polarity of video signals for sub-pixels adjacent to each other in two intersecting directions (e.g., row-and-column directions). The frame inversion driving method is a method of reversing the polarity of video signals to be written to all the sub-pixels Vpix in one frame corresponding to one screen with the same polarity at a time. The display device 2 may employ any one of the driving methods described above.

In the explanation of the present embodiment, the M scanning lines $\mathbf{24}_1$, $\mathbf{24}_2$, $\mathbf{24}_3$, . . . , and $\mathbf{24}_M$ may be referred to as the scanning lines 24 when they are collectively handled. Scanning lines $\mathbf{24}_m$, $\mathbf{24}_{m+1}$, and $\mathbf{24}_{m+2}$ illustrated in FIG. 3 are part of the M scanning lines $\mathbf{24}_1$, $\mathbf{24}_2$, $\mathbf{24}_3$, . . . , and $\mathbf{24}_M$. The N signal lines $\mathbf{25}_1$, $\mathbf{25}_2$, $\mathbf{25}_3$, . . . , and $\mathbf{25}_N$ may be referred to as the signal lines 25 when they are collectively handled. Signal lines $\mathbf{25}_n$, $\mathbf{25}_{n+1}$, and $\mathbf{25}_{n+2}$ illustrated in FIG. 3 are part of the N signal lines $\mathbf{25}_1$, $\mathbf{25}_2$, $\mathbf{25}_3$, . . . , and $\mathbf{25}_N$.

The display area 21 is provided with wiring of the signal lines 25 and the scanning lines 24, for example. The signal lines 25 supply pixel signals to TFT elements Tr in the corresponding sub-pixels Vpix. The scanning lines 24 drive the TFT elements Tr. The signal lines 25 extend on a plane parallel to the surface of the glass substrate. The signal lines 25 supply the data for driving pixels generated based on the pixel signals for outputting an image to the sub-pixels Vpix. The sub-pixels Vpix each include the TFT element Tr and a liquid crystal element LC. The TFT element Tr is a thin film transistor, specifically, an n-channel metal oxide semiconductor (MOS) TFT in this example. One of the source and the drain of the TFT element Tr is coupled to the signal line 25, the gate thereof is coupled to the scanning line 24, and the other of the source and the drain thereof is coupled to a first end of the liquid crystal element LC. The first end of the liquid crystal element LC is coupled to the other of the source and the drain of the TFT element Tr. A second end of the liquid crystal element LC is coupled to a common electrode COM. The common electrode COM is supplied with a drive signal from a drive electrode driver, which is not illustrated. The drive electrode driver may be part of the drive element 3 or an independent circuit.

The sub-pixel Vpix is coupled to other sub-pixels Vpix belonging to the same row in the display area 21 by the scanning line 24. The scanning line 24 is coupled to the gate driver and supplied with the vertical scanning pulse of a scanning signal from the gate driver. The sub-pixel Vpix is coupled to other sub-pixels Vpix belonging to the same column in the display area 21 by a corresponding one of the signal lines 25. The signal lines 25 are coupled to the source driver and supplied with the pixel signals from the source driver. The sub-pixel Vpix is also coupled to the other sub-pixels Vpix belonging to the same column in the display area 21 by a corresponding one of the common electrodes COM. Each of the common electrodes COM is coupled to the drive electrode driver, which is not illustrated, and supplied with the drive signals from the drive electrode driver.

The gate driver applies the vertical scanning pulse to each of the gates of the TFT elements Tr of the respective sub-pixels Vpix via a corresponding one of the scanning lines 24. The gate driver thus sequentially selects one row (one horizontal line) out of the sub-pixels Vpix arranged in a matrix in the display area 21 as a target of image output. The source driver supplies, via the signal lines 25, the pixel signals to the sub-pixels Vpix included in the horizontal line sequentially selected by the gate driver. These sub-pixels Vpix perform image output of the horizontal line based on the supplied pixel signals.

As described above, the gate driver drives the scanning lines 24 to sequentially scan the scanning lines 24, thereby sequentially selecting one horizontal line in the display device 2. The source driver supplies the pixel signals to the sub-pixels Vpix belonging to the horizontal line via the signal lines 25, thereby performing image output on each horizontal line in the display device 2. To perform the image output operation, the drive electrode driver applies the drive signal to each of the common electrodes COM corresponding to the horizontal line.

The display area 21 includes a color filter. The color filter includes a grid-like black matrix 76*a* and openings 76*b*. The black matrix 76*a* is formed to cover the outer peripheries of the sub-pixels Vpix as illustrated in FIG. 3. In other words, the black matrix 76*a* is arranged at boundaries between the two-dimensionally arranged sub-pixels Vpix, thereby having a grid shape. The black matrix 76*a* is made of a material having a high light absorption rate. The openings 76*b* are openings formed by the grid shape of the black matrix 76*a* and formed at positions corresponding to the respective sub-pixels Vpix.

The openings 76*b* have color areas corresponding to the sub-pixels Vpix of three colors (e.g., red (R), green (G), and blue (B)) or four colors. Specifically, the openings 76*b* have color areas colored with three colors of red (R), green (G), and blue (B), which are an aspect of a first color, a second color, and a third color, and a color area of a fourth color (e.g., white (W)), for example. In the color filter, the color areas colored with the three colors of red (R), green (G), and blue (B) are periodically arrayed on the respective openings 76*b*, for example. In a case where the fourth color is white (W), the color filter applies no color to the opening 76*b* of white (W). In a case where the fourth color is another color, the color filter applies the color employed as the fourth color to the opening 76*b*. In the color filter according to the present embodiment, the color areas of the three colors of R, G, and B and the fourth color (e.g., white (W)), that is, a total of four colors are arranged at the respective sub-pixels Vpix illustrated in FIG. 3 as one group to serve as a pixel Pix. The pixel signal supplied to one pixel Pix according to the present embodiment corresponds to output of the pixel Pix including the sub-pixels Vpix of red (R), green (G), and blue (B), and the fourth color (e.g., white (W)). In the description of the present embodiment, red (R), green (G), blue (B), and white (W) may be simply referred to as R, G, B, and W, respectively. In a case where the pixel Pix includes the sub-pixels Vpix of two or less colors or five or more colors, digital data corresponding to the number of colors is supplied based on original image data.

The color filter may be a combination of other colors as long as it is colored with difference colors. Color filters typically have higher luminance in the color area of green (G) than in the color areas of red (R) and blue (B). In a case where the fourth color is white (W), the color filter may be made of transmissive resin to produce white.

When viewed in a direction orthogonal to the front surface, the scanning lines 24 and the signal lines 25 in the display area 21 are arranged at areas overlapping with the black matrix 76*a* of the color filter. In other words, the scanning lines 24 and the signal lines 25 are hidden behind the black matrix 76*a* when viewed in a direction orthogonal to the front surface. In the display area 21, areas not provided with the black matrix 76*a* correspond to the openings 76*b*.

Figure 4:
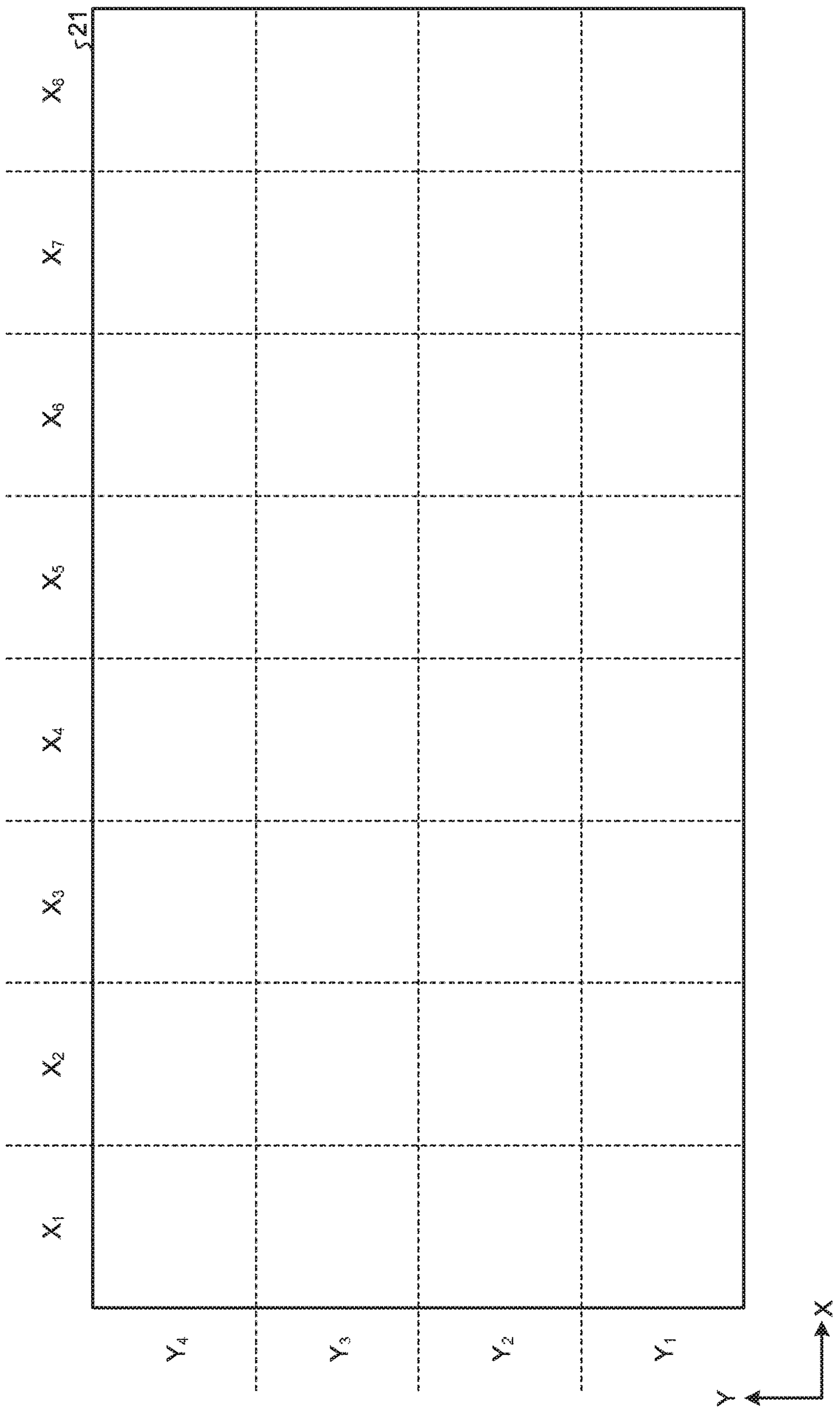
FIG. 4 is a diagram of an example of division in a display area.

FIG. 4 is a diagram of an example of division in the display area 21. The display area 21 is divided into a plurality of partial areas. Specifically, as illustrated in FIG. 4, for example, the display area 21 is divided into eight equal parts of $X_1$, $X_2$, . . . , and $X_8$ in the X-direction. The display area 21 is also divided into four equal parts of $Y_1$, $Y_2$, $Y_3$, and $Y_4$ in the Y-direction. As a result, the display area 21 has 8×4 partial areas. Let us assume a case where the display area 21 includes 800 pixels Pix in the X-direction and 480 pixels Pix in the Y-direction, that is, 800×480 pixels Pix arranged in a matrix, for example.

In this case, one partial area illustrated in FIG. 4 includes 100×120 pixels Pix. The example illustrated in FIG. 4 and the number of pixels in the display area 21 are given by way of example only. The configuration is not limited thereto and may be appropriately changed.

Figure 5:
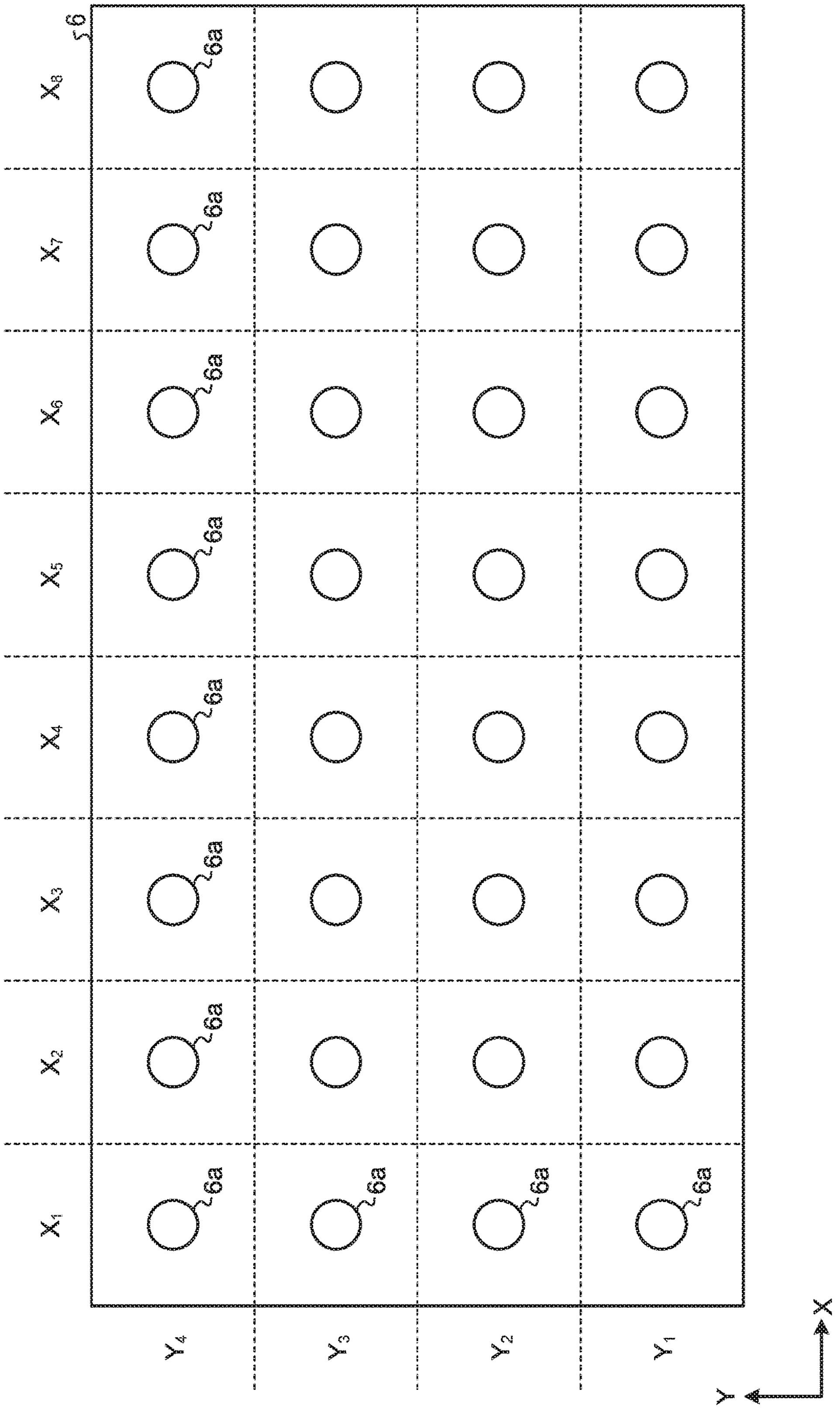
FIG. 5 is a diagram of an example of a correspondence relation between a plurality of light sources of a light source device and a plurality of partial areas.

FIG. 5 is a diagram of an example of the correspondence relation between the light sources 6*a* of the light source device 6 and the partial areas. The light sources 6*a* illustrated in FIG. 5 are arranged in a manner corresponding to the division of the partial areas illustrated in FIG. 4. The partial areas correspond to the light sources 6*a* of the light source device 6 on a one-to-one basis. Specifically, as illustrated in FIG. 5, for example, each of the partial areas corresponds to a corresponding one of the light sources 6*a*. While the light source 6*a* is a light emitting diode (LED), for example, this is given as an example of the specific structure of the light source 6*a*. The structure is not limited thereto and may be appropriately changed. In the present embodiment, each of the partial areas in FIG. 5 is associated with a corresponding one of the light sources 6*a*.

However, the configuration is not limited thereto. The configuration of the light sources 6*a* may be appropriately changed as long as it can control the amounts of light emitted individually in the respective partial areas and adjust the luminance of the partial areas.

The light from each of the light sources 6*a* reaches not only a corresponding one of the partial areas precisely but also the partial areas near the corresponding one. When both of two light sources 6*a* corresponding to two adjacent partial areas are turned on, for example, the two partial areas are irradiated with synthesized light of the light from the two light sources 6*a*.

The light source controller 102 according to the present embodiment employs local dimming to control the operations of the light sources 6*a*. In other words, the light source controller 102 controls the operations of the light sources 6*a* such that the amounts of light emitted from the light sources 6*a* can provide the luminance required for the respective partial areas. If the output gradation values of all the pixels Pix included in the partial area $(X_1,Y_1)$ illustrated in FIG. 4 correspond to black (e.g., (R,G,B)=(0,0,0)), for example, the light source controller 102 does not turn on the light source 6*a* corresponding to $(X_1,Y_1)$. Let us assume a case where the ratio of the output gradation values of the pixels Pix that require the highest luminance in two partial areas is 1:2, for example. In this case, the light source controller 102 can control the two light sources 6*a* corresponding to the two partial areas such that the ratio of the luminance of light emitted from the two light sources 6*a* is 1:2. This control is one of the simplest and the most schematic control performed when the ratio of the output gradation values is 1:2.

As described above, however, the light from each of the light sources 6*a* reaches not only the corresponding partial area precisely but also the partial areas near the corresponding partial area. To precisely perform local dimming, it is necessary to consider the relation between the light sources 6*a*.

Figure 6:
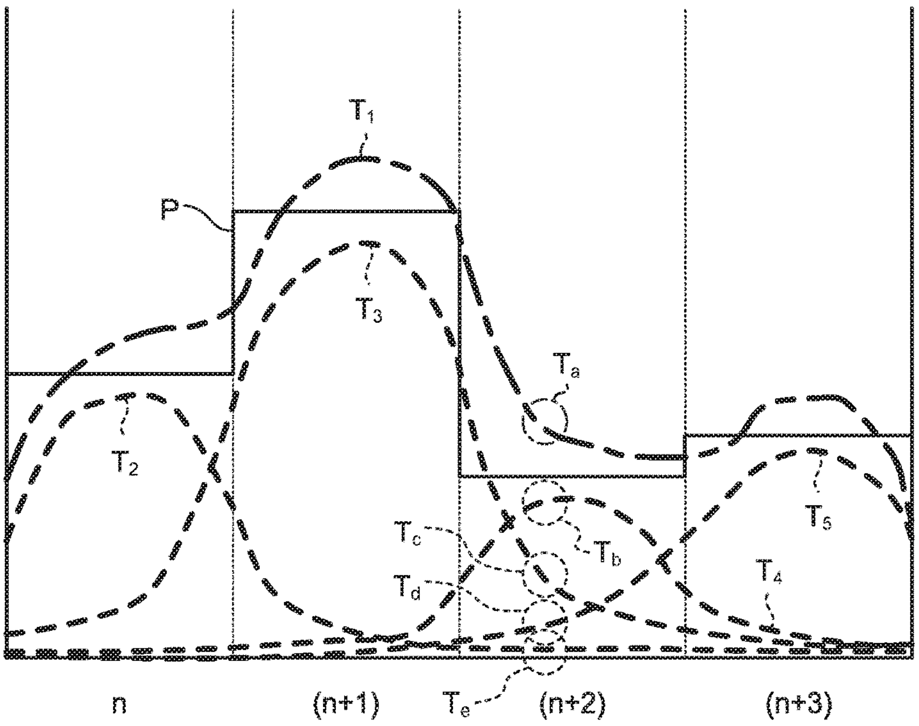
FIG. 6 is a graph indicating an example of a correspondence relation between a control pattern of four light sources aligned in one direction, luminance distributions of the corresponding four light sources, and a luminance distribution obtained by synthesizing light from the four light sources.
Figure 7:
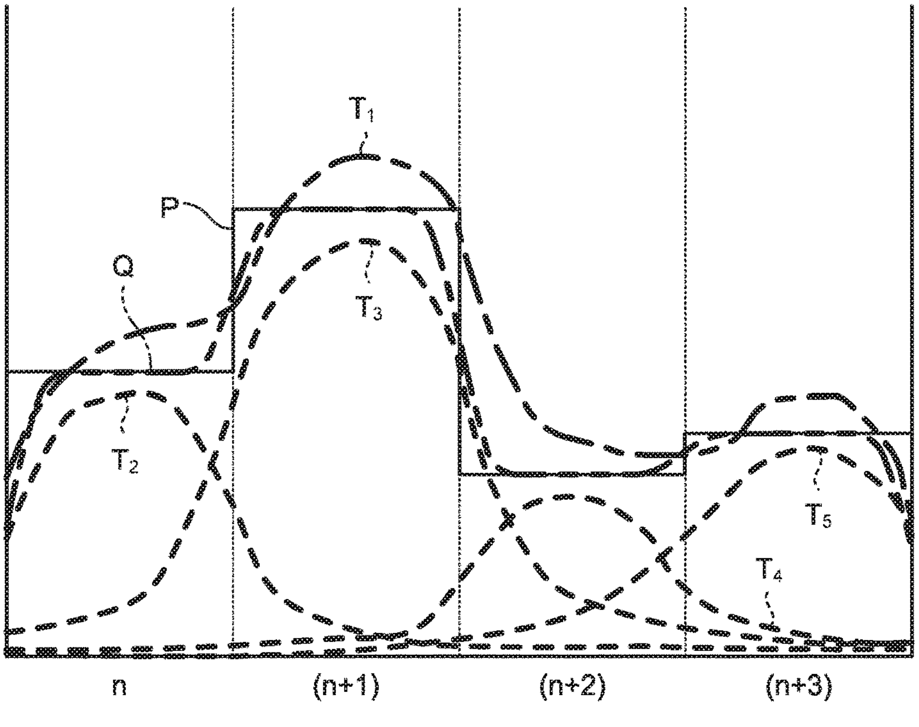
FIG. 7 is a graph indicating a calculated luminance distribution of four partial areas resulting from correction of output gradation values according to the present embodiment.

FIG. 6 is a graph indicating an example of the correspondence relation between a control pattern P of four light sources 6*a* aligned in one direction, luminance distributions $T_2$, $T_3$, $T_4$, and $T_5$ of the corresponding four light sources 6*a*, and a luminance distribution $T_1$ obtained by synthesizing light from the four light sources 6*a*. The horizontal axis in FIG. 6 and FIG. 7, which will be described later, is one of the X-axis and the Y-axis. FIG. 6 and FIG. 7, which will be described later, illustrate four light sources 6*a* corresponding to four partial areas n, (n+1), (n+2), and (n+3) aligned in one direction (the X-direction or the Y-direction). The partial area (n+3) is positioned at an end in the direction.

In the example illustrated in FIG. 6, the four light sources 6*a* corresponding to the four partial areas n, (n+1), (n+2), and (n+3) are turned on at amounts of light exhibiting the luminance distributions $T_2$, $T_3$, $T_4$, and $T_5$, respectively, in a manner corresponding to the control pattern P of the four light sources 6*a*. The luminance distribution of light emitted to the four partial areas n, (n+1), (n+2), and (n+3) is represented by the luminance distribution $T_1$ obtained by synthesizing the light from the four light sources 6*a*. More specifically, in the luminance distribution $T_1$, luminance $T_a$ of light at a certain position in the partial area (n+2), for example, is obtained by synthesizing luminance $T_b$, $T_c$, $T_d$, and $T_e$ generated by the light from the respective four light sources 6*a* at the certain position.

The control pattern P illustrated in FIG. 6 indicates the amounts of light indicated by drive signals for the four light sources 6*a* corresponding to the four partial areas n, (n+1), (n+2), and (n+3). In other words, the control pattern P illustrated in FIG. 6 indicates the amounts of light emitted from the four light sources 6*a* that are determined correspondingly to the luminance required for the four partial areas n, (n+1), (n+2), and (n+3). In FIG. 6, the required luminance becomes higher in the order of the partial areas (n+1), n, (n+3), and (n+2).

As described above, the luminance distribution $T_1$ is not equal to the control pattern P. To precisely calculate the luminance distribution $T_1$, it is necessary to perform an arithmetic operation based on the luminance distributions $T_2$, $T_3$, $T_4$, and $T_5$. However, it is difficult to generalize luminance distributions of a plurality of light sources 6*a*, such as the luminance distributions $T_2$, $T_3$, $T_4$, and $T_5$, by an expression having coordinates as a variable, for example. To precisely derive information indicating the luminance distributions of the respective light sources 6*a* corresponding to the amounts of light indicated by the drive signals, it is necessary to perform individual measurement in advance. To hold the information, a storage capacity is required that comprehensively stores therein the measured luminance distribution patterns of the light sources 6*a*. The information can hold by storing by storing the sampled luminance distributions in a form of a look up table (LUT). In this case, an approximate value of the luminance between the samples can be calculated by interpolation. Thus, the size of the information can be decreased to some extent and the storage capacity required to hold the information can be reduced to some extent.

Even in this case, however, a memory having a storage capacity depending on the degree of sampling is still required. In the processing for calculating the luminance distribution (e.g., the luminance distribution $T_1$) by synthesizing the light from the light sources 6*a*, an arithmetic operation is performed based on the LUT and an algorithm for the interpolation. To perform the arithmetic operation, however, enormous computing power is required. The following schematically describes a specific example using the example illustrated in FIG. 6. The luminance distributions $T_2$, $T_3$, $T_4$, and $T_5$ of the respective light sources 6*a* are calculated based on the control pattern P. Then, by using the luminances Tb, Tc, Td, and Te at a certain position in their luminance distributions T2, T3, T4, and T5, respectively, the luminance Ta is calculated at a plurality of positions. The positions at which the luminance Ta is calculated are not limited to these given positions. Thus, the luminance distribution $T_1$ is calculated by synthesizing the luminance distributions $T_2$, $T_3$, $T_4$, and $T_5$. To calculate the luminance distributions in the display area 21 by the same method as that of the mechanism for calculating the luminance distribution $T_1$, the processing load further increases depending on the number of partial areas and light sources 6*a*.

As described above, to precisely perform local dimming, it is necessary to perform an arithmetic operation for deriving the luminance distributions in the entire display area 21 having an enormous processing load as described with reference to FIG. 6. Furthermore, the LUT indicating the luminance distributions of the light sources 6*a* is required as a precondition for the arithmetic operation. To address this, in the present embodiment, local dimming is performed using a simpler mechanism.

Figure 8:
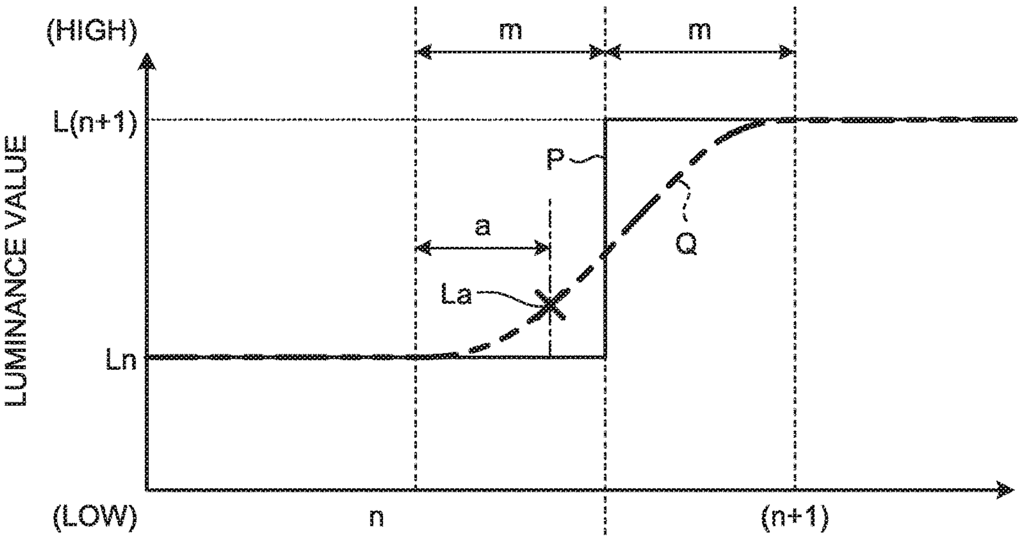
FIG. 8 is a graph indicating an example of a relation between the calculated luminance distribution between two partial areas, the positions of pixels arranged from the boundary between the partial areas to the position of an m-th pixel, and the position of the a-th pixel from the side farther from the boundary out of the pixels arranged from the boundary to the position of the m-th pixel.

FIG. 7 is a graph indicating a calculated luminance distribution Q of the four partial areas n, (n+1), (n+2), and (n+3) resulting from correction of the output gradation values according to the present embodiment. FIG. 8 is a graph indicating an example of the relation between the calculated luminance distribution Q between the two partial areas n and (n+1), the positions of the pixels Pix arranged from the boundary between the partial areas to the position of an m-th pixel, and the position of the a-th pixel Pix from the side farther from the boundary out of the pixels Pix arranged from the boundary to the position of the m-th pixel. The light source controller 102 according to the present embodiment determines the amount of light emitted from each light source 6*a* corresponding to a corresponding one of the partial areas, based on the luminance of light required for the corresponding partial area. Specifically, the light source controller 102 outputs drive signals for turning on a plurality of light sources 6*a* at the amounts of light that can provide the luminance required for the output gradation values of the pixels Pix included in a plurality of partial areas. The luminance of each of the partial areas, which corresponds to the amount of light indicated by the drive signal, is uniquely determined on a partial area basis as indicated by the control pattern P in FIG. 7, for example. The light sources 6*a* according to the present embodiment are assumed to operate so as to emit the corresponding amounts of light according to the drive signals independently of the actual luminance distributions (e.g., the luminance distributions $T_1$, $T_2$, $T_3$, $T_4$, and $T_5$)

As indicated by the control pattern P, simply controlling the amounts of light emitted from the light sources 6*a* individually may possibly cause boundaries between adjacent partial areas to be visually recognized because of the difference in luminance between the adjacent partial areas. To address this, if the amounts of light emitted from two light sources 6*a* corresponding to two adjacent partial areas are different, the display controller 101 according to the present embodiment performs first correction and second correction. The pixels Pix in one partial area of the adjacent partial areas are subjected to the first correction. The one partial area (first partial area) is a partial area corresponding to the light source (first light source) 6*a* emitting a relatively large amount of light. In the first correction, the display controller 101 decreases the output gradation values of the pixels Pix arranged in a region (first region) extending from the boundary to a position of an m-th pixel from the boundary out of the pixels Pix in the one partial area. The boundary means a boundary between the one partial area and the other partial area. As described above, the one partial area is a partial area corresponding to the light source 6*a* emitting a relatively large amount of light. The other partial area (second partial area) is a partial area corresponding to the light source (second light source) 6*a* emitting a relatively small amount of light. The pixels Pix in the other partial area are subjected to the second correction. In the second correction, the display controller 101 increases the output gradation values of the pixels Pix arranged in a region (second region) extending from the boundary to a position of an m-th pixel from the boundary out of the pixels Pix in the other partial area. The display apparatus 1 of the present embodiment corrects the output gradation values of the pixels Pix arranged in the first region and second region by the first correction and the second correction, respectively. As a result, the display apparatus 1 of the present embodiment can reproduce a state similar to that indicated by the calculated luminance distribution Q illustrated in FIGS. 7 and 8. In other words, the display apparatus 1 of the present embodiment can reproduce the state where the luminance of light emitted to the region extending from the position of the m-th pixel Pix of the one partial area (e.g., the partial area (n+1)) to the position of the m-th pixel Pix of the other partial area (e.g., the partial area n) gradually changes between the one partial area and the other partial area.

Specifically, assume that Ln is the amount of light emitted from the light source 6*a* emitting a relatively small amount of light, and L(n+1) is the amount of light emitted from the light source 6*a* emitting a relatively large amount of light. Further, assume that the pixel Pix at a predetermined position is the first pixel, and La is the amount of light emitted from a first virtual light source or a second virtual light source that irradiates the a-th pixel Pix from the predetermined position. The display controller 101 determines La using Expression (2) based on Expression (1). The first virtual light source is a virtual light source obtained by virtually changing the amount of light emitted from the light source 6*a* emitting a relatively large amount of light. The second virtual light source is a virtual light source obtained by virtually changing the amount of light emitted from the light source 6*a* emitting a relatively small amount of light. The term "virtually changing" does not mean changing the amount of light emitted from the light source 6*a* itself but means changing the output gradation values of the pixels Pix irradiated by the light source 6*a* so as to provide display output (brightness) at the same level as that in the case where the actual amount of light emitted from the light source 6*a* is changed. The value of La determined by the display controller 101 indicates "the amount of light emitted from the virtual light source that irradiates the pixel Pix and is arranged at a position corresponding to the position of the pixel Pix in the X-Y coordinate system illustrated in FIGS. 4 and 5" corresponding to the brightness reproduced by changing the output gradation value of the pixel Pix. The term "predetermined position" means the position of the m-th pixel Pix from the boundary and means the position of the pixel Pix on the side of the light source 6*a* emitting a relatively small amount of light. The term "the a-th pixel from the predetermined position" means the a-th pixel Pix in the direction from the light source 6*a* emitting a relatively small amount of light toward the light source 6*a* emitting a relatively large amount of light.

$$A=a/2m \tag{1}$$

$$La=L(n+1)-\{L(n+1)-\mathrm{Ln}\}\times(2\times A\hat{}3\times A\hat{}2+1) \tag{2}$$

The display controller 101 calculates the amount (La) of light emitted from the first virtual light source or the second virtual light source individually for each of all pixels Pix arranged from the boundary to the position of the m-th pixels on both sides of the boundary. The calculated luminance distribution Q is obtained by connecting a calculated curve and the amounts of light emitted from the light sources 6*a* corresponding to the partial areas within the region farther from the boundary than the m-th pixel Pix. The calculated curve is a curve or an approximate curve obtained by connecting the amounts of light (La) calculated for all the pixels Pix arranged from the boundary to the position of the m-th pixels on both sides of the boundary.

The display controller 101 corrects the luminance based on the determined La. Specifically, given that P1 is the output gradation value prior to the second correction of the pixel Pix in the second region, that is, the output gradation value prior to the second correction of the pixel Pix at a position (a m) included in the other partial area (e.g., the partial area n) and that P2 is the output gradation value after the second correction thereof, the display controller 101 calculates P2 by Expression (9):

$$P2=P1\times La/\mathrm{Ln} \tag{9}$$

La in Expression (9) satisfies Ln<La<(Ln+L(n+1))/2. In other words, the output gradation value after the second correction is an output gradation value obtained when the pixel Pix controlled by the output gradation value prior to the second correction is irradiated with light from the second virtual light source. The amount of light from the second virtual light source is more than the amount (Ln) of light emitted from the light source 6*a* emitting a relatively small amount of light and less than an intermediate amount ((Ln+L(n+1))/2) of the amounts of light emitted from the two light sources 6*a*.

Specifically, when P1 is expressed by (R,G,B,W)=(0,0,0,50), and La/Ln=1.5 is satisfied, for example, P2 is expressed by (R,G,B,W)=(0,0,0,75). As described above, the display controller 101 corrects the output gradation values, thereby increasing the luminance of the pixel Pix arranged at the position corresponding to La to the luminance higher than the luminance corresponding to the amount (Ln) of light emitted from the light source 6*a* emitting a relatively small amount of light.

Given that P3 is the output gradation value prior to the first correction of the pixel Pix in the first region, that is, the output gradation value prior to the first correction of the pixel Pix at a position (a>m) included in the one partial area (e.g., the partial area (n+1)) and that P4 is the output gradation value after the first correction thereof, the display controller 101 calculates P4 by Expression (10):

$$P4=P3\times La/L(n+1) \tag{10}$$

La in Expression (10) satisfies (Ln+L(n+1))/2<La<L(n+1). In other words, the output gradation value after the first correction is an output gradation value obtained when the pixel Pix controlled by the output gradation value prior to the first correction is irradiated with light from the first virtual light source. The amount of light from the first virtual light source is less than the amount (L(n+1)) of light emitted from the light source 6*a* emitting a relatively large amount of light and more than an intermediate amount ((Ln+L(n+1))/2) of the amounts of light emitted from the two light sources 6*a*.

Specifically, when P3 is expressed by (R,G,B,W)=(0,0,0,50), and La/L(n+1)=0.8 is satisfied, for example, P4 is expressed by (R,G,B,W)=(0,0,0,40). As described above, the display controller 101 corrects the output gradation values, thereby decreasing the luminance of the pixel Pix arranged at the position corresponding to La to the luminance lower than the luminance corresponding to the amount (L(n+1)) of light emitted from the light source 6*a* emitting a relatively large amount of light.

Given that $n_1$ ($n_1$ is a natural number) is the number of all the pixels in the display area 21 according to the present embodiment, $n_1$=800×480 is satisfied. Given that $n_2$ ($n_2$ is a natural number) is the number of pixels Pix aligned in the X-direction or the Y-direction in one partial area, $n_2$=100 or $n_2$=120 is satisfied. m (m is a natural number) in "the m-th pixel Pix from the boundary" is 8, for example. Therefore, $n_1>n_2>m\geq 1$ is satisfied. The values of $n_1$, $n_2$, and m are given by way of example only and are not limited thereto. The values of $n_1$, $n_2$, and m may be appropriately changed as long as $n_1>n_2>m\geq 1$ is satisfied.

In the first correction and the second correction, the display controller 101 makes the degree of correction larger for the output gradation values of the pixels Pix positioned closer to the boundary. In the partial area n, as illustrated in FIG. 8, for example, the amount (La) of light emitted from the second virtual light source is calculated such that the curve of the calculated luminance distribution Q is closer to the amount (L(n+1)) of light emitted from the light source 6*a* emitting a relatively large amount of light than the amount (Ln) of light emitted from the light source 6*a* emitting a relatively small amount of light as the position is closer to the boundary between the partial areas. In the partial area (n+1), the amount (La) of light emitted from the first virtual light source is calculated such that the curve of the calculated luminance distribution Q is closer to the amount (Ln) of light emitted from the light source 6*a* emitting a relatively small amount of light than the amount (L(n+1)) of light emitted from the light source 6*a* emitting a relatively large amount of light as the position is closer to the boundary between the partial areas. To make the degree of correction larger for the output gradation values of the pixels Pix positioned closer to the boundary in the first correction and the second correction, m≥2 is satisfied.

The correction of the output gradation values has been explained using the combination of the partial areas n and (n+1) as an example. The display controller 101 corrects the output gradation values for the combinations of other two partial areas, such as the partial areas (n+1) and (n+2) and the partial areas (n+2) and (n+3), by the same mechanism as that described above.

Figure 9:
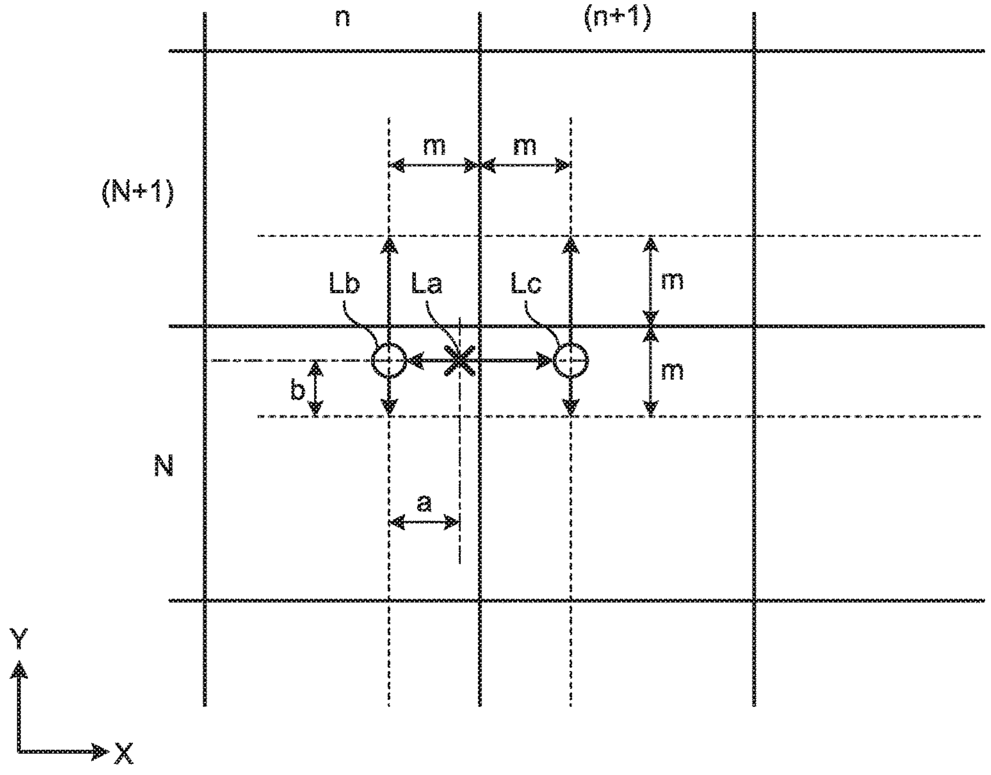
FIG. 9 is a diagram schematically illustrating an example of correction of the output gradation values in the X-direction and the Y-direction.

FIG. 9 is a diagram schematically illustrating an example of correction of the output gradation values in the X-direction and the Y-direction. As illustrated in FIG. 4, the partial areas according to the present embodiment are aligned in the X-direction and the Y-direction. The display controller 101 corrects the output gradation values both in the X-direction and the Y-direction. Specifically, as illustrated in FIG. 9, for example, the display controller 101 corrects the output gradation values for a combination of two partial areas N and (N+1) aligned in the Y-direction by the same mechanism as that for the combination of the partial areas n and (n+1) described above. The display controller 101 also corrects the output gradation values for the combination of the two partial areas n and (n+1) aligned in the X-direction. More specifically, as illustrated in FIG. 9, LN is the amount of light emitted from the light source 6*a* emitting a relatively small amount of light, and L(N+1) is the amount of light emitted from the light source 6*a* emitting a relatively large amount of light, for example. The display controller 101 calculates amounts (Lb, Lc) of light emitted from the second virtual light source that irradiates the b-th pixels Pix from the side of the light source 6*a* emitting a relatively small amount of light, out of the pixels Pix arranged from the boundary to the position of the m-th pixel, the side being farther from the boundary. In other words, assume that a boundary BN is a boundary between the two partial areas N and (N+1), a pixel PNm is the m-th pixel Pix from the boundary BN and located in the partial area N, and a pixel P(N+1)m is the m-th pixel Pix from the boundary BN and located in the partial area (N+1). The display controller 101 calculates the amounts (Lb, Lc) of light emitted from the second virtual light source that irradiates the b-th pixels Pix from the pixel PNm, each of the b-th pixels Pix from the pixel PNm being located in a region extending from a position of the pixel PNm to a position of the pixel P(N+1)m. Lb and Lc are the amounts of light emitted from the second virtual light source corresponding to the m-th (or m+1-th) pixels Pix from the boundary between the partial areas n and (n+1) on both sides of the boundary. If the amount Lb of light emitted from the second virtual light source in the partial area n is different from the amount Lc of light emitted from the second virtual light source in the partial area (n+1) positioned at the same coordinate of the partial area n in the Y-direction, the display controller 101 performs the first correction and the second correction. In the first correction, the display controller 101 decreases the output gradation values of the pixels Pix arranged from the boundary to the position of the m-th pixel out of the pixels Pix in one partial area corresponding to the second virtual light source emitting a relatively large amount of light. The boundary is a boundary between the one partial area corresponding to the second virtual light source emitting a relatively large amount of light and the other partial area corresponding to the second virtual light source emitting a relatively small amount of light. In the second correction, the display controller 101 increases the output gradation values of the pixels Pix arranged from the boundary to the position of the m-th pixel out of the pixels Pix in the other partial area. In this example, Ln is the amount of light emitted from the second virtual light source emitting a relatively small amount of light, and L(n+1) is the amount of light emitted from the second virtual light source emitting a relatively large amount of light. The display controller 101 according to the present embodiment calculates the amount (La) of light emitted from the second virtual light source (or the first virtual light source) that irradiates the a-th pixel Pix from the side of the light source 6*a* emitting a relatively small amount of light, out of the pixels Pix arranged from the boundary to the position of the m-th pixel, the side being farther from the boundary. In other words, assume that a boundary Bn is a boundary between the two partial areas n and (n+1), a pixel Pnm is the m-th pixel Pix from the boundary Bn and located in the partial area n, and a pixel P(n+1)m is the m-th pixel Pix from the boundary Bn and located in the partial area (n+1). The display controller 101 calculates the amount (La) of light emitted from the second virtual light source (or the first virtual light source) that irradiates the a-th pixel Pix from the pixel Pnm, the a-th pixel Pix from the pixel Pnm being located in a region extending from a position of the pixel Pnm to a position of the pixel P(n+1)m. In a case where the relation of relative luminance is reversed in the combination of the two partial areas N and (N+1), Lb and Lc are the amount of light emitted from the first virtual light source. Also in this case, the first correction and the second correction are performed with respect to the X-direction.

In the description above, the display controller 101 calculates the amount (e.g., Lb and Lc) of light emitted from the first virtual light source and the second virtual light source with respect to the Y-direction first and then calculates the amount (La) of light emitted from the first virtual light source and the second virtual light source with respect to the X-direction. Alternatively, the display controller 101 may calculate the amount of light emitted from the first virtual light source and the second virtual light source with respect to the X-direction first and then calculate the amount of light emitted from the first virtual light source and the second virtual light source with respect to the Y-direction.

As described above, the display apparatus 1 of the present embodiment determines the amount of light emitted from each light source 6*a* corresponding to a corresponding one of the partial areas based on the luminance of light required for the corresponding partial area, and performs local dimming by the processing independent of the luminance distributions (e.g., the luminance distribution $T_2$) of the corresponding light sources 6*a*. The display apparatus 1 of the present embodiment does not require an arithmetic operation for deriving the luminance distribution (e.g., the luminance distribution $T_1$) by synthesizing luminance distributions of a plurality of light sources 6*a* and any resource for holding the luminance distributions of the light sources 6*a*. Consequently, the display apparatus 1 of the present embodiment can perform local dimming with a smaller load. Further, the present embodiment performs the first correction and the second correction. Consequently, the display apparatus 1 of the present embodiment can perform local dimming with a smaller load while making boundaries less likely to be visually recognized.

When m≥2 is satisfied, the present embodiment makes the degree of correction larger for the output gradation values of the pixels Pix positioned closer to the boundary in the first correction and the second correction. As a result, the display apparatus 1 of the present embodiment can reduce the difference in luminance between two light sources 6*a* corresponding to two partial areas adjacent to each other with the boundary therebetween. Consequently, the display apparatus 1 of the present embodiment can perform local dimming while making boundaries less likely to be visually recognized.

The display apparatus 1 of the present embodiment determines the amount La of light emitted from the first virtual light source or the second virtual light source using Expression (2) based on Expression (1). As a result, the display apparatus 1 of the present embodiment can formulate the processing of reducing the difference in luminance between two light sources 6*a* corresponding to two partial areas adjacent to each other with the boundary therebetween. Consequently, the display apparatus 1 of the present embodiment can perform local dimming with a smaller load while making boundaries less likely to be visually recognized.

Modifications

The following describes a modification of the embodiment according to the present invention. In the description of the modification, components similar to those according to the embodiment are denoted by the same reference numerals, and overlapping explanation thereof may be omitted.

Figure 10:
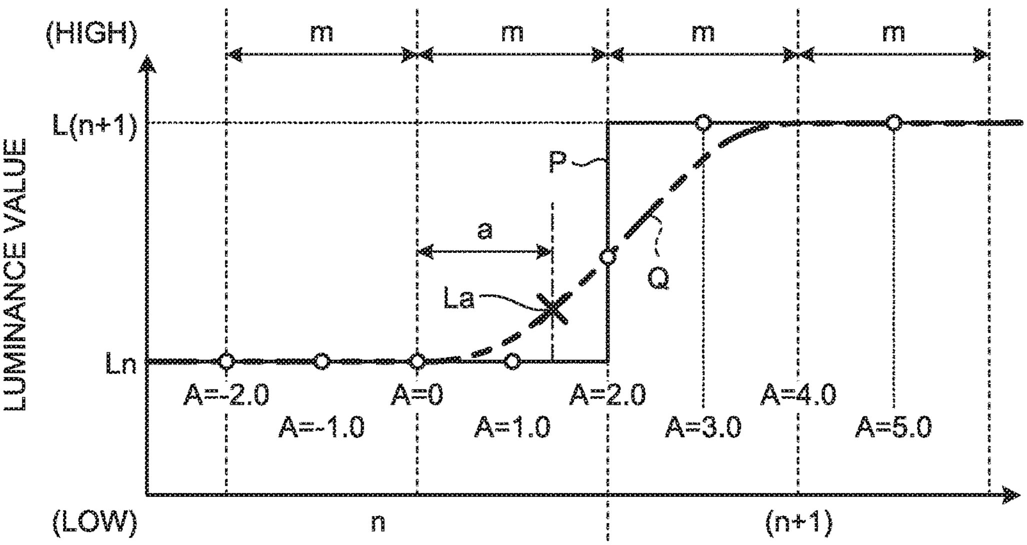
FIG. 10 is a graph indicating another example of the relation between the calculated luminance distribution between the two partial areas, the positions of pixels arranged from the boundary between the partial areas to the position of the m-th pixel, and the position of the a-th pixel from the side farther from the boundary out of the pixels arranged from the boundary to the position of the m-th pixel.

FIG. 10 is a graph indicating another example of the relation between the calculated luminance distribution Q between the two partial areas n and (n+1), the positions of the pixels Pix arranged from the boundary between the partial areas to the position of the m-th pixel from the boundary, and the position of the a-th pixel Pix from the m-th pixel. Assume that Ln is the amount of light emitted from the light source 6*a* emitting a relatively small amount of light, and that L(n+1) is the amount of light emitted from the light source 6*a* emitting a relatively large amount of light. Further, assume that La is the amount of light emitted from the first virtual light source or the second virtual light source that irradiates the a-th pixel Pix from the side of the light source 6*a* emitting a relatively small amount of light, out of the pixels Pix arranged from the boundary to the position of the m-th pixel, the side being farther from the boundary. Further, assume that Coef is a predetermined variable. The display controller 101 according to the modification determines Coef using one of Expressions (4) to (7) selected according to A represented by Expression (3). The display controller 101 determines La by Expression (8) using the determined Coef. When A<1 is satisfied, the display controller 101 uses Expression (4). When 1≤A<2 is satisfied, the display controller 101 uses Expression (5). When 2≤A<3 is satisfied, the display controller 101 uses Expression (6). When 3≤A<4 is satisfied, the display controller 101 uses Expression (7). In other words, assume that the boundary Bn is a boundary between the two partial areas n and (n+1), the pixel Pnm is the m-th pixel Pix from the boundary Bn and located in the partial area n, and the pixel P(n+1)m is the m-th pixel Pix from the boundary Bn and located in the partial area (n+1). In other words, the amount (La) denotes an amount of light emitted from the first virtual light source or the second virtual light source that irradiates the a-th pixel Pix from the pixel Pnm, the a-th pixel Pix from the pixel Pnm being located in a region extending from the position of the pixel Pnm to the $$A = a/(2m/4) \tag{3}$$

$$Coef = 0.5\times\{-1/6\times(2.0-A-2.0)^\wedge 3\} \tag{4}$$

$$Coef = 0.5\times[1/6\times\{3\times(2.0-A)^\wedge 3-6\times(2.0-A)^\wedge 2+4\}]+\{-1/6\times(3.0-A-2.0)^\wedge 3\} \tag{5}$$

$$Coef = 0.5\times[1/6\times\{3\times(A-2.0)^\wedge 3-6\times(A-2.0)^\wedge 2+4\}]+[1/6\times\{3\times(3.0-A)^\wedge 3-6\times(3.0-A)^\wedge 2+4\}]+\{-1/6\times(4.0-A-2.0)^\wedge 3\} \tag{6}$$

$$Coef = 0.5\times\{-1/6\times(A-2.0-2.0)^\wedge 3\}+[1/6\times\{3\times(A-3.0)^\wedge 3-6\times(A-3.0)^\wedge 2+4\}]+[1/6\times\{3\times(4.0-A)^\wedge 3-6\times(4.0-A)^\wedge 2+4\}]+\{-1/6\times(5.0-A-2.0)^\wedge 3\} \tag{7}$$

$$La = L(n+1)-\{L(n+1)-\mathrm{Ln}\}\times Coef \tag{8}$$

While FIG. 10 illustrates the values of A obtained when m=8 is satisfied, this is given by way of example only. The values of A are not limited thereto and may vary depending on the value of m.

According to the modification, Ln can be coupled to L(n+1) by a three-dimensional spline curve where {Ln+L(n+1)}/2 is a block boundary, Ln is the value of the pixel Pix positioned at −m/2 from the block boundary, and L(n+1) is the value of the pixel Pix positioned at +m/2 from the block boundary.

The specific mechanism that performs an arithmetic operation for deriving the curve coupling Ln and L(n+1) is not limited to the embodiment and the modification described above and may be appropriately changed. The display controller 101, for example, may have Ln and L(n+1) as variables and determine the amounts of light emitted from the first virtual light source and the second virtual light source using a predetermined equation defining the curve coupling Ln and L(n+1). Alternatively, a LUT defining the curve may be provided. In this case, local dimming can be performed with a LUT that can be stored in a storage having a significantly smaller storage capacity than that for the conventional LUT indicating the luminance distributions of the light sources 6*a*.

The present invention naturally provides advantageous effects clearly defined by the description in the present specification or appropriately conceivable by those skilled in the art out of other advantageous effects provided by the aspects described in the present embodiment.

The present invention includes the following aspects.

1. A display apparatus comprising:

a plurality of light sources aligned in at least one direction;

a display device that includes a display area provided with $n_1$ pixels and that is irradiated with light from the light sources to output an image;

a light source controller that controls an operation of the light sources in accordance with a display output content of the display device; and a display controller that controls an output gradation value of part or all of the pixels based on an amount of light emitted from each of the light sources, wherein the display area includes a plurality of partial areas, the partial areas corresponding to the light sources on a one-to-one basis, wherein the partial areas each include $n_2$ pixels aligned in at least the one direction, wherein the light source controller determines the amount of light emitted from each light source corresponding to a corresponding one of the partial areas based on luminance of light required for the corresponding partial area, wherein the display controller performs first correction and second correction when the amounts of light emitted from two light sources corresponding to two adjacent partial areas are different, wherein the first correction is a correction of decreasing the output gradation values of the pixels arranged in a first region extending from a boundary to a position of an m-th pixel from the boundary out of the pixels in a first partial area, the second correction is a correction of increasing the output gradation values of the pixels arranged in a second region extending from the boundary to a position of an m-th pixel from the boundary out of the pixels in a second partial area, and the boundary is a boundary between the first partial area and the second partial area, wherein the first partial area is one of the two adjacent partial areas and corresponds to a first light source, and the second partial area is the other of the two adjacent partial areas and corresponds to a second light source, wherein the first light source is one of the two light sources and emits a relatively large amount of light, and the second light source is the other of the two light sources and emits a relatively small amount of light, wherein the output gradation value after the first correction is an output gradation value obtained when the pixels controlled by the output gradation value prior to the first correction are irradiated with light from a first virtual light source, and the amount of light from the first virtual light source is less than the amount of light emitted from the first light source emitting a relatively large amount of light and more than an intermediate amount of the amounts of light emitted from the two light sources, wherein the output gradation value after the second correction is an output gradation value obtained when the pixels controlled by the output gradation value prior to the second correction are irradiated with light from a second virtual light source, and the amount of light from the second virtual light is more than the amount of light emitted from the second light source emitting a relatively small amount of light and less than the intermediate amount of the amounts of light emitted from the two light sources, and wherein $n_1 > n_2 > m \geq 1$ is satisfied.

2. The display apparatus according to 1, wherein $m \geq 2$ is satisfied, and wherein, in the first correction and the second correction, the display controller makes a degree of correction larger for the output gradation values of the pixels positioned closer to the boundary.

3. The display apparatus according to 1 or 2, wherein the display controller determines La using Expression (2) based on Expression (1):

$$A=a/2m \tag{1}$$

$$La=L(n+1)-\{L(n+1)-\mathrm{Ln}\}\times(2\times A\hat{}3\times A\hat{}2+1) \tag{2}$$

where Ln is the amount of light emitted from the second light source emitting a relatively small amount of light, L(n+1) is the amount of light emitted from the first light source emitting a relatively large amount of light, and La is the amount of light emitted from the first virtual light source or the second virtual light source that irradiates an a-th pixel from the m-th pixel of the second partial area, the a-th pixel from the m-th pixel being located in a region extending from the position of the m-th pixel of the first partial area to the position of the m-th pixel of the second partial area.

4. The display apparatus according to 1 or 2, wherein the display controller determines Coef using one of Expressions (4) to (7) selected according to A represented by Expression (3), determines La by Expression (8) using the determined Coef, uses Expression (4) when A<1 is satisfied, uses Expression (5) when 1≤A<2 is satisfied, uses Expression (6) when 2≤A<3 is satisfied, and uses Expression (7) when 3≤A<4 is satisfied:

$$A=a/(2m/4) \tag{3}$$

$$Coef=0.5\times\{-1/6\times(2.0-A-2.0)\hat{}3\} \tag{4}$$

$$Coef=0.5\times[1/6\times\{3\times(2.0-A)\hat{}3-6\times(2.0-A)\hat{}2+4\}]+\{-1/6\times(3.0-A-2.0)\hat{}3\} \tag{5}$$

$$Coef=0.5\times[1/6\times\{3\times(A-2.0)\hat{}3-6\times(A-2.0)\hat{}2+4\}]+[1/6\times\{3\times(3.0-A)\hat{}3-6\times(3.0-A)\hat{}2+4\}]+\{-1/6\times(4.0-A-2.0)\hat{}3\} \tag{6}$$

-continued $$Coef = 0.5\times\{-1/6\times(A-2.0-2.0)^\wedge 3\} + [1/6\times\{3\times(A-3.0)^\wedge 3-6\times(A-3.0)^\wedge 2+4\}] + [1/6\times\{3\times(4.0-A)^\wedge 3-6\times(4.0-A)^\wedge 2+4\}] + \{-1/6\times(5.0-A-2.0)^\wedge 3\} \quad (7)$$

$$La = L(n+1) - \{L(n+1) - \mathrm{Ln}\}\times Coef \quad (8)$$

where Ln is the amount of light emitted from the second light source emitting a relatively small amount of light, L(n+1) is the amount of light emitted from the first light source emitting a relatively large amount of light, La is the amount of light emitted from the first virtual light source or the second virtual light source that irradiates an a-th pixel from the m-th pixel of the second partial area, the a-th pixel from the m-th pixel being located in a region extending from the position of the m-th pixel of the first partial area to the position of the m-th pixel of the second partial area, and Coef is a predetermined variable.

5. The display apparatus according to 3 or 4, wherein the display controller calculates P2 using Expression (9):

$$P2=P1\times La/\mathrm{Ln} \quad (9)$$

where P1 is the output gradation value prior to the second correction of the pixel in the second region, and P2 is the output gradation value after the second correction thereof, and wherein the display controller calculates P4 using Expression (10):

$$P4=P3\times La/L(n+1) \quad (10)$$

where P3 is the output gradation value prior to the first correction of the pixel in the first region, and P4 is the output gradation value after the first correction thereof.

What is claimed is:

1. A display apparatus comprising:

a plurality of light sources aligned in at least one direction;

a display device that includes a display area provided with $n_1$ pixels and that is irradiated with light from the light sources to output an image;

a light source controller that controls an operation of the light sources in accordance with a display output content of the display device; and a display controller that controls an output gradation value of part or all of the pixels based on an amount of light emitted from each of the light sources, wherein the display area includes a plurality of partial areas, the partial areas corresponding to the light sources on a one-to-one basis, wherein the partial areas each include $n_2$ pixels aligned in at least the one direction, wherein the light source controller determines the amount of light emitted from each light source corresponding to a corresponding one of the partial areas based on luminance of light required for the corresponding partial area, wherein the display controller performs first correction and second correction when the amounts of light emitted from two light sources corresponding to two adjacent partial areas are different, wherein the first correction is a correction of decreasing the output gradation values of the pixels arranged in a first region extending from a boundary to a position of an m-th pixel from the boundary out of the pixels in a first partial area, the second correction is a correction of increasing the output gradation values of the pixels arranged in a second region extending from the boundary to a position of an m-th pixel from the boundary out of the pixels in a second partial area, and the boundary is a boundary between the first partial area and the second partial area, wherein the first partial area is one of the two adjacent partial areas and corresponds to a first light source, and the second partial area is the other of the two adjacent partial areas and corresponds to a second light source, wherein the first light source is one of the two light sources and emits a relatively large amount of light, and the second light source is the other of the two light sources and emits a relatively small amount of light, wherein the output gradation value after the first correction is an output gradation value obtained when the pixels controlled by the output gradation value prior to the first correction are irradiated with light from a first virtual light source, and the amount of light from the first virtual light source is less than the amount of light emitted from the first light source emitting a relatively large amount of light and more than an intermediate amount of the amounts of light emitted from the two light sources, wherein the output gradation value after the second correction is an output gradation value obtained when the pixels controlled by the output gradation value prior to the second correction are irradiated with light from a second virtual light source, and the amount of light from the second virtual light is more than the amount of light emitted from the second light source emitting a relatively small amount of light and less than the intermediate amount of the amounts of light emitted from the two light sources, and wherein $n_1>n_2>m\geq 1$ is satisfied.

2. The display apparatus according to claim 1, wherein $m\geq 2$ is satisfied, and wherein, in the first correction and the second correction, the display controller makes a degree of correction larger for the output gradation values of the pixels positioned closer to the boundary.

3. The display apparatus according to claim 1, wherein the display controller determines La using Expression (2) based on Expression (1):

$$A=a/2m \quad (1)$$

$$La=L(n+1)-\{L(n+1)-\mathrm{Ln}\}\times(2\times A^\wedge 3-3\times A^\wedge 2+1) \quad (2)$$

where Ln is the amount of light emitted from the second light source emitting a relatively small amount of light, L(n+1) is the amount of light emitted from the first light source emitting a relatively large amount of light, and La is the amount of light emitted from the first virtual light source or the second virtual light source that irradiates an a-th pixel from the m-th pixel of the second partial area, the a-th pixel from the m-th pixel being located in a region extending from the position of the m-th pixel of the first partial area to the position of the m-th pixel of the second partial area.

4. The display apparatus according to claim 1, wherein the display controller determines Coef using one of Expressions (4) to (7) selected according to A represented by Expression (3), determines La by Expression (8) using the determined Coef, uses Expression (4) when A<1 is satisfied, uses Expression (5)

when 1≤A<2 is satisfied, uses Expression (6) when 2≤A<3 is satisfied, and uses Expression (7) when 3≤A<4 is satisfied:

$$A = a/(2m/4) \tag{3}$$

$$Coef = 0.5\times\{-1/6\times(2.0 - A - 2.0)^\wedge 3\} \tag{4}$$

$$Coef = 0.5\times[1/6\times\{3\times(2.0 - A)^\wedge 3 - 6\times(2.0 - A)^\wedge 2 + 4\}] + \{-1/6\times(3.0 - A - 2.0)^\wedge 3\} \tag{5}$$

$$Coef = 0.5\times[1/6\times\{3\times(A - 2.0)^\wedge 3 - 6\times(A - 2.0)^\wedge 2 + 4\}] + [1/6\times\{3\times(3.0 - A)^\wedge 3 - 6\times(3.0 - A)^\wedge 2 + 4\}] + \{-1/6\times(4.0 - A - 2.0)^\wedge 3\} \tag{6}$$

$$Coef = 0.5\times\{-1/6\times(A - 2.0 - 2.0)^\wedge 3\} + [1/6\times\{3\times(A - 3.0)^\wedge 3 - 6\times(A - 3.0)^\wedge 2 + 4\}] + [1/6\times\{3\times(4.0 - A)^\wedge 3 - 6\times(4.0 - A)^\wedge 2 + 4\}] + \{-1/6\times(5.0 - A - 2.0)^\wedge 3\} \tag{7}$$

$$La = L(n+1) - \{L(n+1) - \mathrm{Ln}\}\times Coef \tag{8}$$

where Ln is the amount of light emitted from the second light source emitting a relatively small amount of light, L(n+1) is the amount of light emitted from the first light source emitting a relatively large amount of light, La is the amount of light emitted from the first virtual light source or the second virtual light source that irradiates an a-th pixel from the m-th pixel of the second partial area, the a-th pixel from the m-th pixel being located in a region extending from the position of the m-th pixel of the first partial area to the position of the m-th pixel of the second partial area, and Coef is a predetermined variable.

5. The display apparatus according to claim 3, wherein the display controller calculates P2 using Expression (9):

$$P2 = P1\times La/\mathrm{Ln} \tag{9}$$

where P1 is the output gradation value prior to the second correction of the pixel in the second region, and P2 is the output gradation value after the second correction thereof, and wherein the display controller calculates P4 using Expression (10):

$$P4 = P3\times La/L(n+1) \tag{10}$$

where P3 is the output gradation value prior to the first correction of the pixel in the first region, and P4 is the output gradation value after the first correction thereof.

* * * * *